United States Patent
Lay et al.

(10) Patent No.: US 7,382,505 B2
(45) Date of Patent: Jun. 3, 2008

(54) DEVICE WITH PRINTING AND SCANNING CAPABILITY

(76) Inventors: Daniel Travis Lay, 1125 N. Scrivner Pl., Meridian, ID (US) 83642; Brett A. Green, 2100 E. Summerdawn Dr., Meridian, ID (US) 83642; Curtis Reese, 6204 Northview St., Boise, ID (US) 83704

( * ) Notice: Subject to any disclaimer, the term of this patent is extended or adjusted under 35 U.S.C. 154(b) by 963 days.

(21) Appl. No.: 10/273,286

(22) Filed: Oct. 17, 2002

(65) Prior Publication Data

US 2004/0075856 A1   Apr. 22, 2004

(51) Int. Cl.
*H04N 1/04* (2006.01)
*G06K 15/16* (2006.01)
*H04L 12/00* (2006.01)
*G06F 15/02* (2006.01)

(52) U.S. Cl. ............... 358/498; 358/1.15; 358/474; 358/1.12; 358/1.16

(58) Field of Classification Search ............... None
See application file for complete search history.

(56) References Cited

U.S. PATENT DOCUMENTS

| | | | | |
|---|---|---|---|---|
| 4,414,579 A | * | 11/1983 | Dattilo et al. ............... 358/498 |
| 5,365,310 A | * | 11/1994 | Jenkins et al. ............... 399/8 |
| 5,694,528 A | * | 12/1997 | Hube ............... 358/1.14 |
| 6,038,035 A | * | 3/2000 | Wulforst ............... 358/406 |
| 6,175,700 B1 | * | 1/2001 | Miller et al. ............... 399/72 |
| 6,381,343 B1 | * | 4/2002 | Davis et al. ............... 382/112 |
| 6,412,022 B1 | * | 6/2002 | Kumpf et al. ............... 710/1 |
| 6,516,427 B1 | * | 2/2003 | Keyes et al. ............... 714/25 |
| 6,529,616 B1 | * | 3/2003 | Rasmussen et al. ............... 382/112 |
| 6,532,077 B1 | * | 3/2003 | Arakawa ............... 358/1.13 |
| 6,571,000 B1 | * | 5/2003 | Rasmussen et al. ............... 382/112 |
| 6,597,473 B1 | * | 7/2003 | Rasmussen et al. ............... 358/1.9 |
| 6,606,395 B1 | * | 8/2003 | Rasmussen et al. ............... 382/112 |
| 6,644,773 B2 | * | 11/2003 | Bildstein et al. ............... 347/19 |
| 6,912,071 B1 | * | 6/2005 | Rasmussen et al. ............... 358/406 |
| 6,938,202 B1 | * | 8/2005 | Matsubayashi et al. .. 715/501.1 |
| 7,076,086 B2 | * | 7/2006 | Miyake et al. ............... 382/112 |
| 7,202,977 B2 | * | 4/2007 | Robinson et al. ............... 358/3.28 |
| 2002/0111960 A1 | * | 8/2002 | Irons et al. ............... 707/204 |
| 2002/0145747 A1 | * | 10/2002 | Burquist et al. ............... 358/1.14 |
| 2003/0184816 A1 | * | 10/2003 | Kodimer ............... 358/474 |

FOREIGN PATENT DOCUMENTS

| | | | |
|---|---|---|---|
| JP | 61023163 A | * | 1/1986 |
| JP | 09102853 A | * | 4/1997 |
| JP | 2000215144 A | * | 8/2000 |
| JP | 2003060833 A | * | 2/2003 |
| JP | 2004166243 A | * | 6/2004 |

\* cited by examiner

*Primary Examiner*—Twyler L. Haskins
*Assistant Examiner*—Myles D Robinson

(57) ABSTRACT

A system includes a multifunctional peripheral (MFP) and a computer connected to the MFP via a communication link. The MFP includes a scanner for use by walk-up user to scan a page. The computer provides a user interface that enables a user to request a document be printed and then scanned on the MFP.

28 Claims, 14 Drawing Sheets

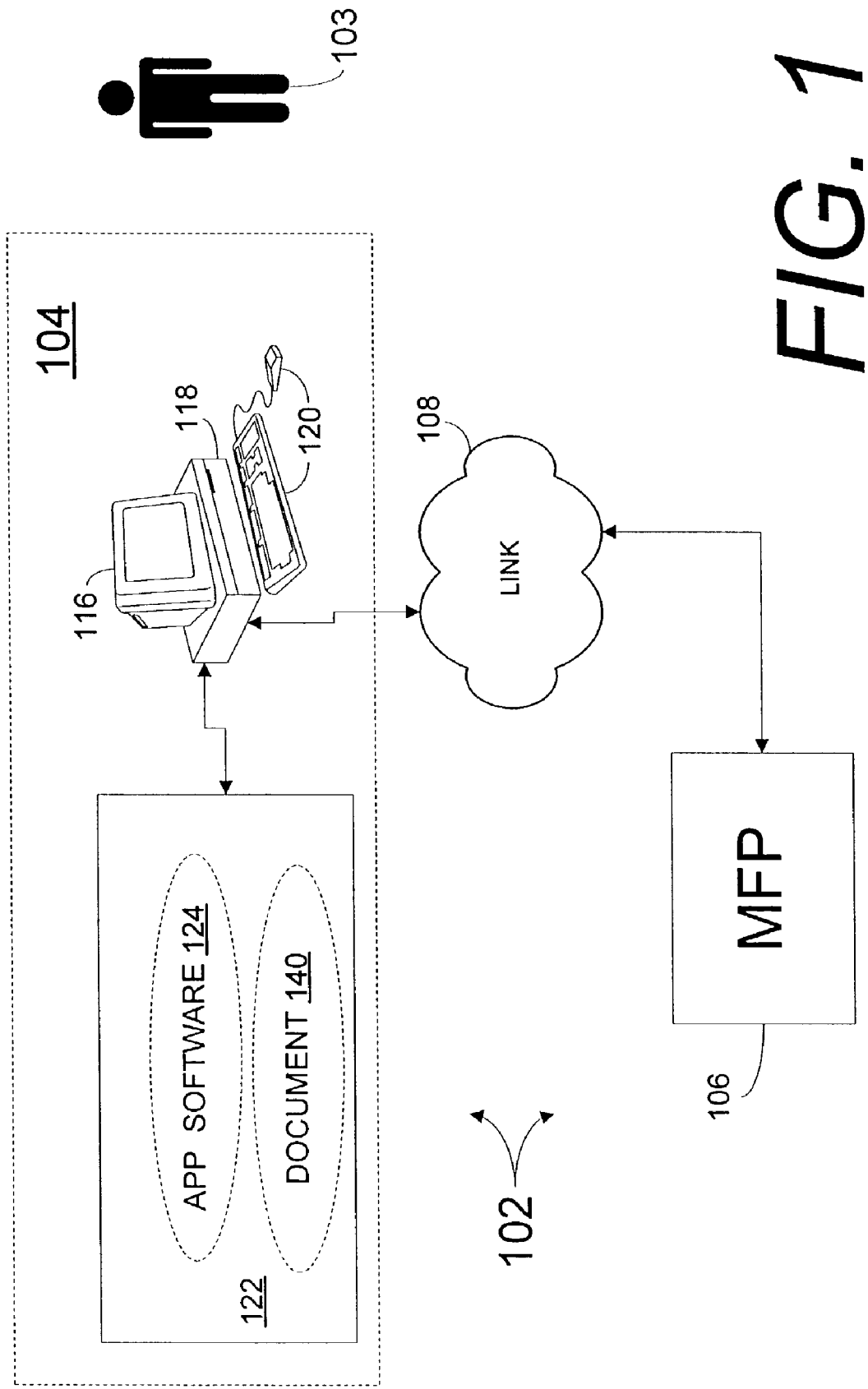

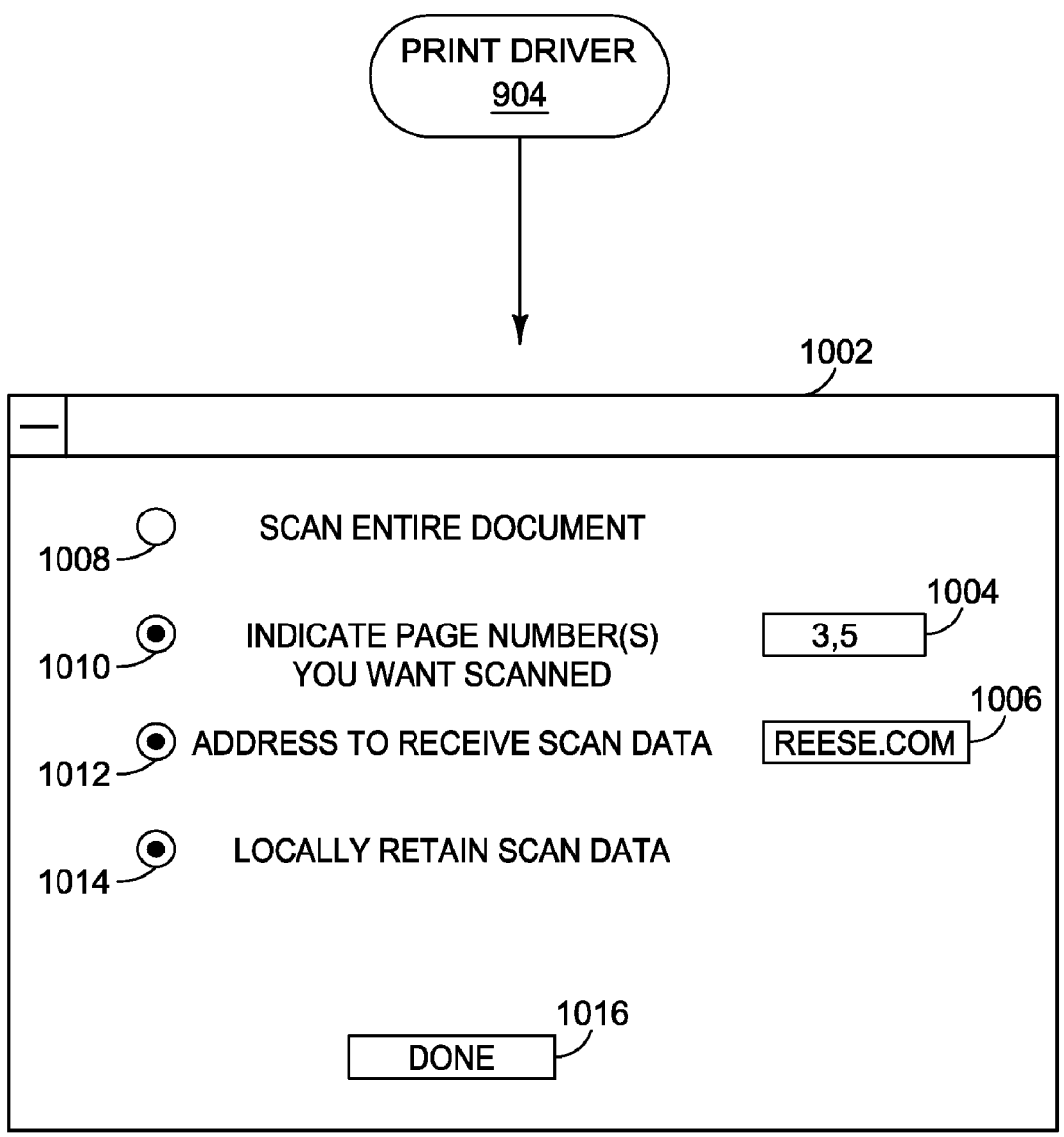
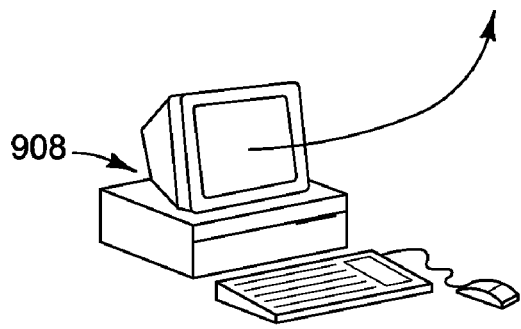
FIG. 10

DEVICE WITH PRINTING AND SCANNING CAPABILITY

BACKGROUND OF THE INVENTION

Peripheral devices have become available which are able to perform a number of related functions, such as copying, printing, faxing and scanning. These devices are sometimes referred to as multifunction peripherals (MFPs). An MFP may include a print engine for printing pages and a scanner. The scanner is typically configured to allow a walk-up user to scan a hardcopy document so as to create data (scan data) that describes the page. After the hardcopy document is scanned, the MFP may allow the walk-up user to send the scan data to a particular destination and/or to print additional copies of the document, etc.

The MFP has gained wide acceptance in the market place. One reason for this market success is associated with the versatility of these devices. It would be desirable, however, to increase the versatility of an MFP beyond the present state of the art.

BRIEF DESCRIPTION OF THE DRAWINGS

FIG. 1 is high-level block diagram of a computer system that incorporates one embodiment of the invention;

FIG. 10 illustrates an example of a user interface that may be provided by the print driver.

DETAILED DESCRIPTION OF THE INVENTION

Figure 2A:
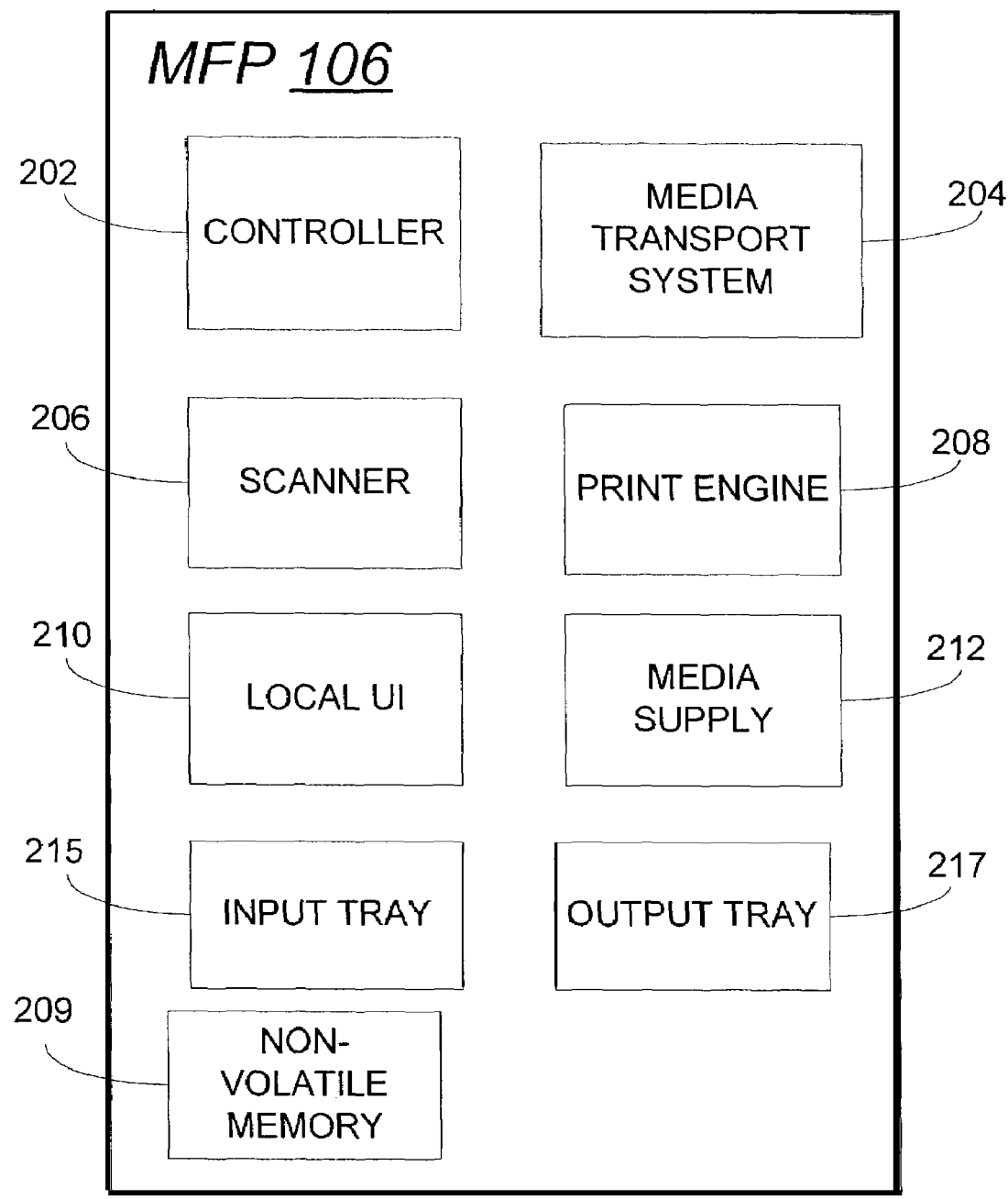
FIG. 2A is a high-level block diagram of an MFP.

FIG. 1 is high-level block diagram of a computer system 102 that incorporates one embodiment of the invention. The computer system 102 includes a computer 104 and a multifunction peripheral (MFP) 106. In the following discussion, it will be assumed (for illustration purposes) that a user 103 operates the computer 104.

The computer 104 can communicate with the MFP 106 via a communication link 108. The communication link 108 may represent any suitable communication system. The communication link 108 may represent a wired and/or wireless type communication system. In some implementations, for example, the communication link 108 may represent an intranet and/or the Public Internet. In other implementations, for example, the communication link 108 may represent a cable that directly connects the two devices.

The computer 104 includes a display monitor 116, a processing unit 118, user input devices 120 and a memory 122. Stored in the memory 122 is "application software" 124 and a document 140. The processing unit 118 can retrieve and execute the application software 124. The computer 104 may include an operating system (not shown) that supports the execution of the application software 124.

It is noted that although the computer 104 is depicted as being a desktop computer, the computer 104 may in fact be any type of computing device that can send a print job to a printer. Thus, for example, the computer 104 may be a desktop computer, a laptop or a handheld device (e.g., a personal digital assistant).

It is also noted for the later discussion that the application software 124 enables the computer 104 to: a) convert the document 140 into a print job that is in a format the MFP 106 can interpret; and b) transmit the print job to the MFP 106.

In some implementations, the application software 124 may represent, for example, a word processing application and/or a print driver.

MFP Block Diagram

FIG. 2A is a high-level block diagram of the MFP 106. As shown in FIG. 2A, the MFP 106 includes a controller 202, a media transport system 204, a scanner 206 and a print engine 208. The MFP 106 may further include a non-volatile memory 209 (e.g., a disk drive), a local user interface (UI) 210 (e.g., a local control panel), a media supply 212, an input tray 215 and an output tray 217. The MFP 106 may also include additional components that are not shown.

Figure 2B:
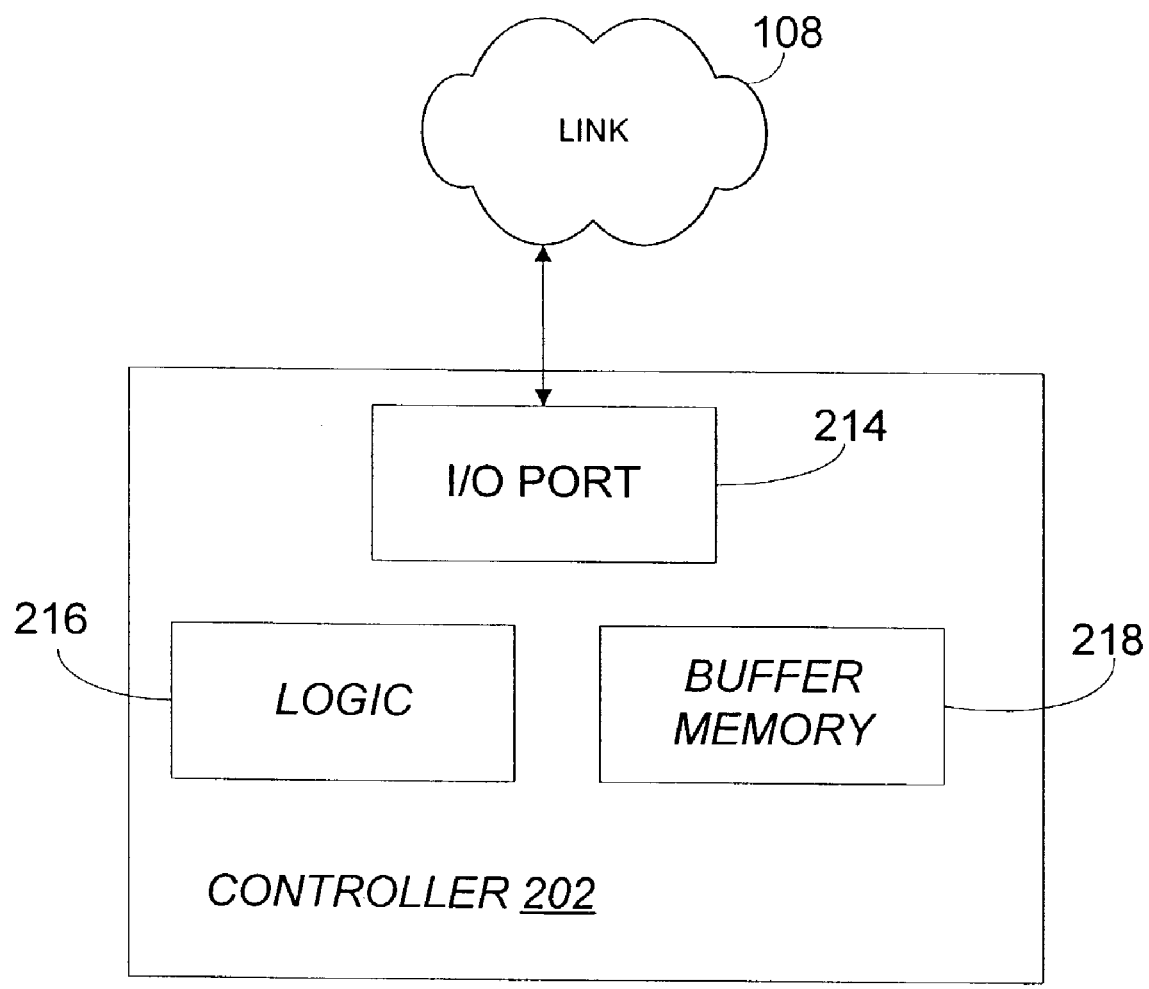
FIG. 2B is a high-level block diagram of an MFP controller.

FIG. 2B illustrates, in this example, the general construction of the controller 202. As shown, the controller 202 includes an I/O port 214, logic 216 and a buffer memory 218. In general, the logic 216 enables the controller 202 to orchestrate the operation of the MFP 106. The logic 216 may represent, for example, various hardware components (e.g., processor circuits, ASIC devices, etc) and/or firmware modules. In some implementations, the logic 216 may include an embedded WEB server.

The I/O port 214 enables the MFP 106 to both receive data (e.g., print job data) and to transmit data over the communication link 108. The buffer memory 218 can be used to temporarily store data, such as the data (scan data) generated by the scanner 206.

MFP Functions

It is noted that a user can make use of the MFP 106 to perform a number of functions. For example, a walk-up user can make use of the scanner 206 to scan a document. For ease of discussion, data generated by scanning a document may be referred to herein as "scan data".

The print engine 208 enables the MFP 106 to function as a page printer. A remote user, for example, can transmit a print job to the MFP 106 in order to print a document. A walk-up user can also use the printing capability of the MFP to print copies of a scanned document.

It is noted that the print engine 208 may incorporate any suitable type of printing technology. For example, the print engine 208 may be a laser print engine, an ink jet print engine, a dye sublimation print engine, a thermal dye print engine, etc.

Post Print Functions

The MFP 106 may offer a number of optional post printing functions. For example, the MFP 106 may allow a user to collate printed pages in a certain way, staple groups of pages, etc.

One optional post print function that is provided by the MFP 106 may be referred to herein as the "POST PRINT SCAN" (PPS) function. In order to perform this particular post print function, the MFP 106 prints a page at the print engine 208 and then moves the printed page (by use of the media transport system 204) to the scanner 206. When the just printed page reaches the scanner 206, the printed page is scanned.

It is noted for the later discussion that the MFP 106 may selectively enable or disable the PPS function for each page printed. Whether or not the MFP 106 enables or disables this function may be based upon user input received at the local user interface 210. The MFP 106 may also enable or disable the PPS function based upon pre-determined commands included in a print job. The PPS function is described in greater detail below.

MFP Construction

Figure 3A:
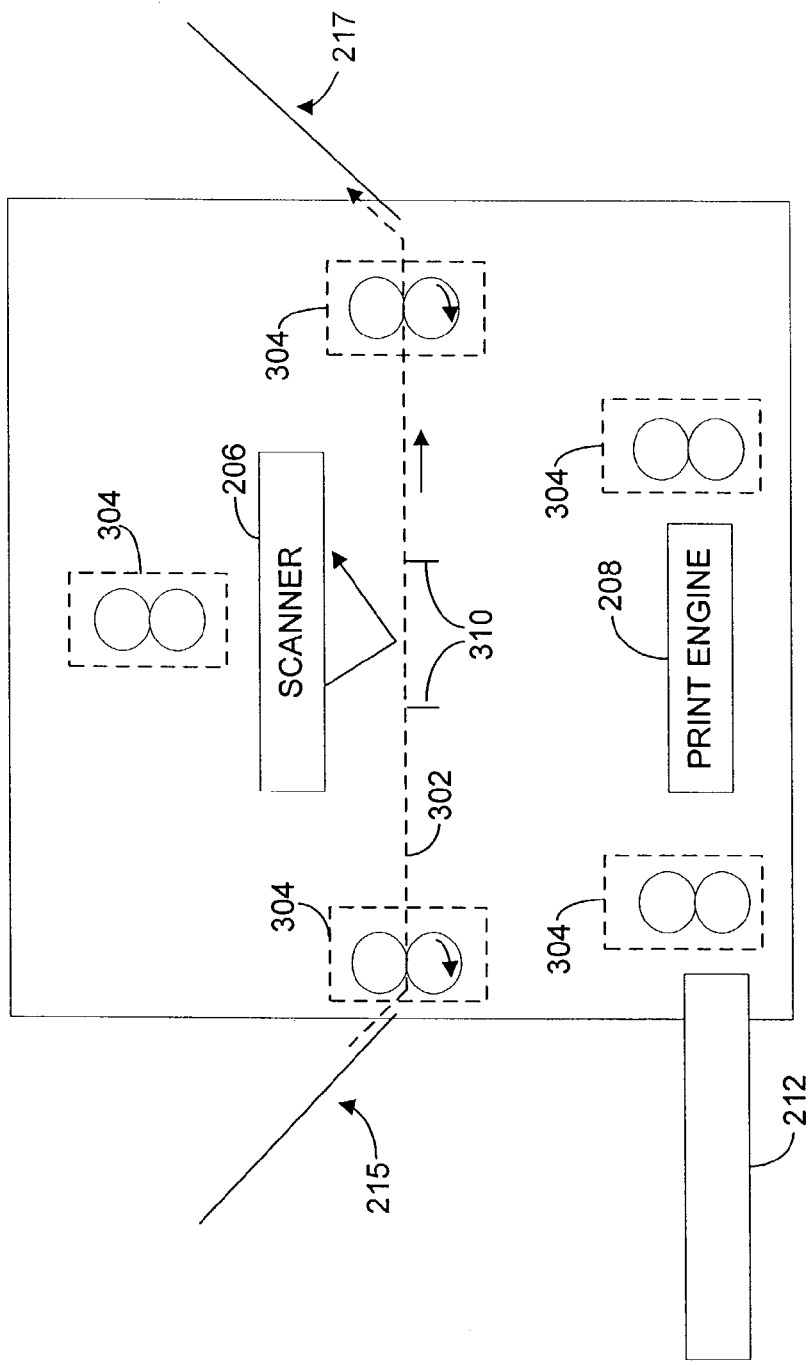
FIGS. 3A-C illustrates schematically one possible arrangement of the internal components of the MFP.
Figure 3B:
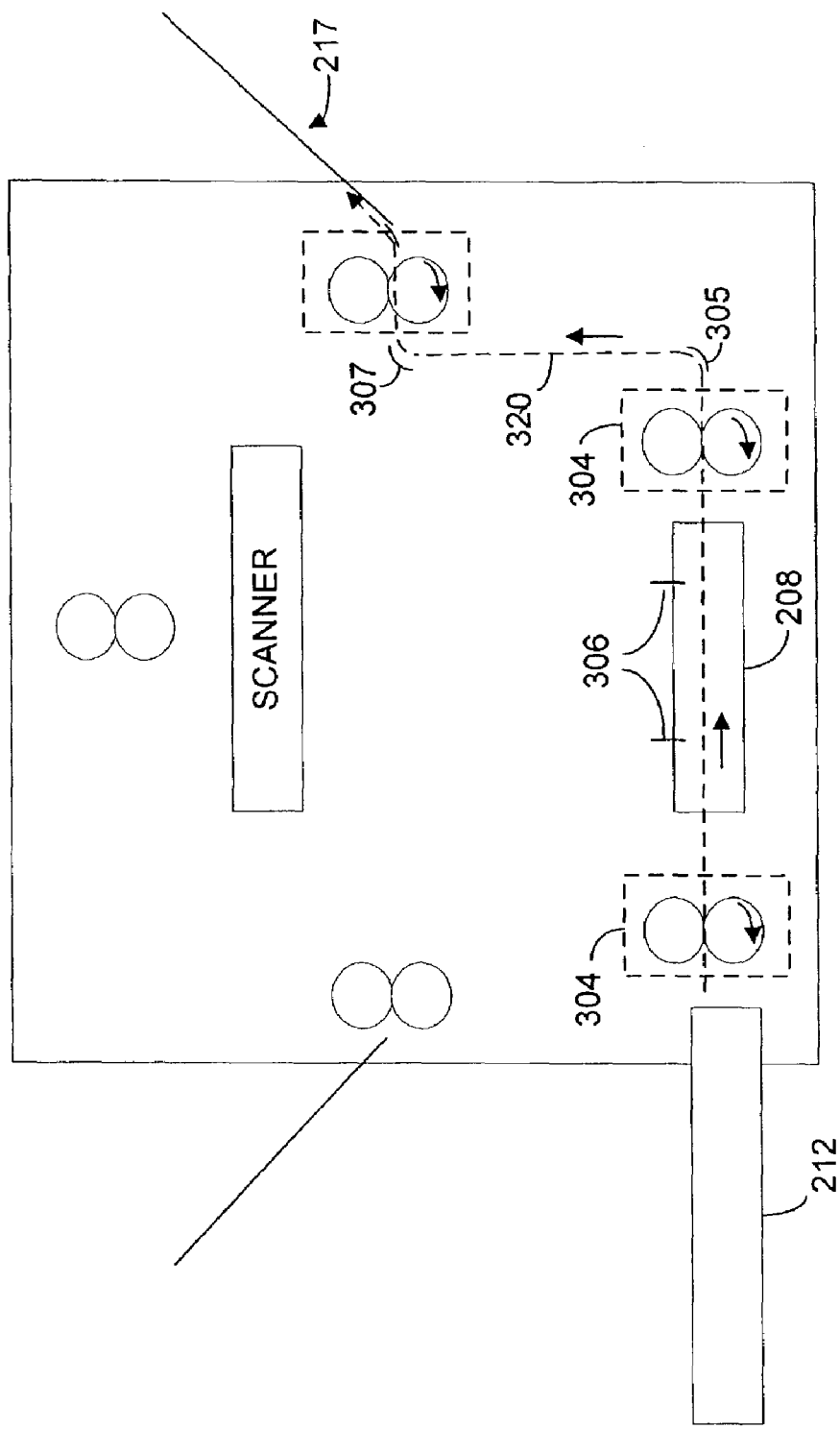
Figure 3C:
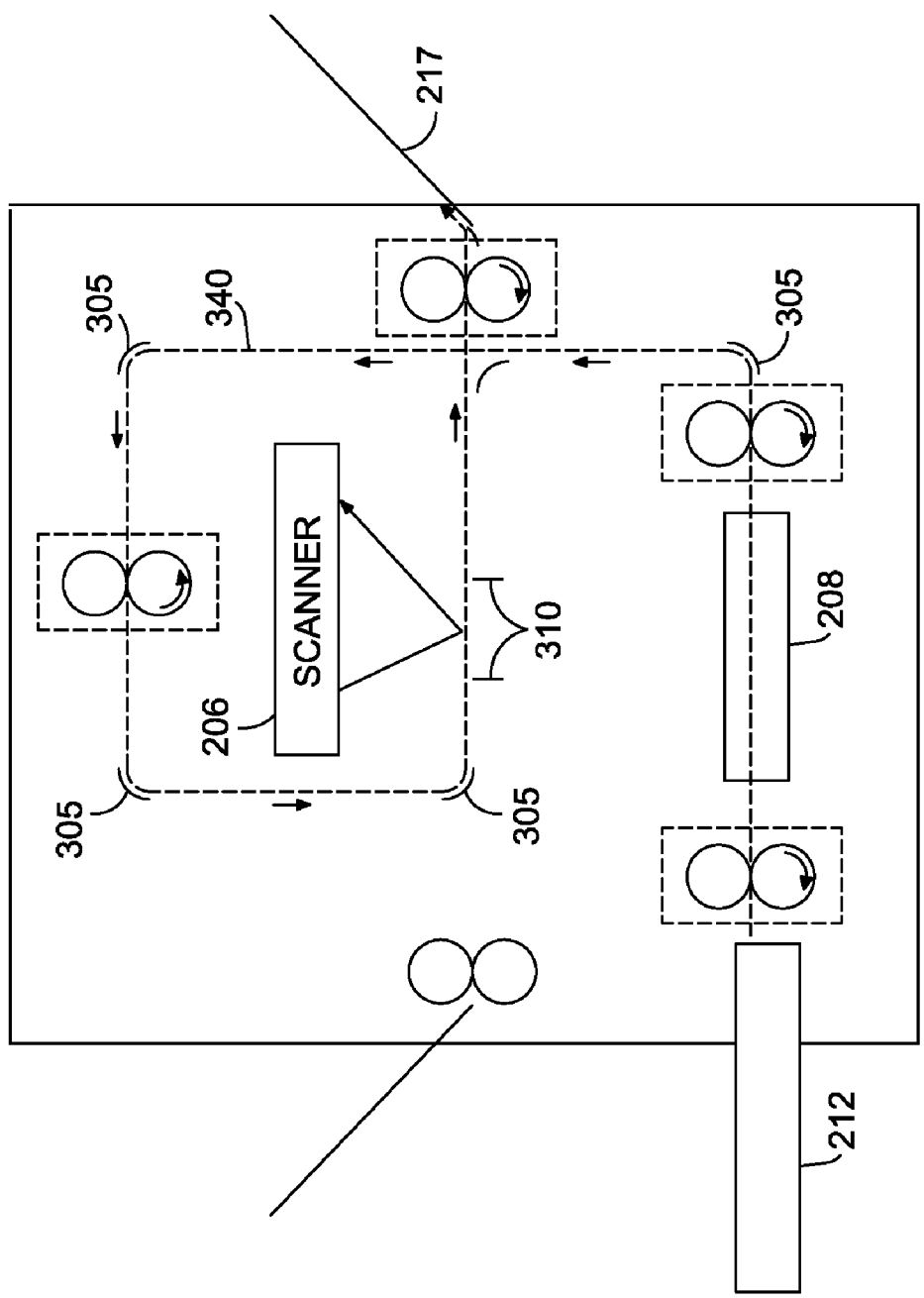

There are a number of ways the MFP 106 may be constructed. FIGS. 3A-C are high level diagrams illustrating schematically one possible arrangement of the scanner 206, the print engine 208, the input tray 215 and the output tray 217.

These same three figures also illustrate three page transport paths (shown by dotted lines) that may exist within the MFP 106: a first page transport path 302 (see FIG. 3A); a second page transport path 320 (see FIG. 3B); and a third page transport path 340 (see FIG. 3C). The media transport system 204 may include various rollers 304, guide members 305, sensors and moveable diverter mechanisms 307 to selectively transport pages along any of these paths.

In this example, all three transport paths discharge media to the output tray 217. The output tray 217 is typically arranged so that the discharged media is accessible to a walk-up user.

Walk-Up User Scanning

As indicated above, a walk-up user of the MFP 106 can use the MFP 106 to scan a printed document. FIG. 3A illustrates generally how the MFP 106 may operate to perform this particular function.

Referring to FIG. 3A, in order to scan a printed page a walk-up user can place the page in the input tray 215. The walk-up user can then interact with the local UI 210 to input a request that the page be scanned.

In response to this user input, the controller 202 causes the transport system 204 to move the page from the tray 215 along the path 302. When the page reaches a pre-determined area (scan area) 310, the controller 202 causes the scanner 206 to scan the page. As the page is scanned, the scanner 206 generates data (scan data) that describes the page. The controller 202 may store the scan data in the buffer memory 218 (see FIG. 2B).

Once the scan data is acquired by the MFP 106, the controller 202 may further process this data in a number of ways. For example, the controller 202 may print copies of the scan data and/or transmit the scan data to a particular destination specified by the walk-up user.

Page Printing (PPS Function not Enabled)

As indicated above, the MFP 106 can also function to print a page with or without the PPS function enabled. FIG. 3B illustrates generally how the MFP 106 may operate to print a page when the PPS function is not enabled.

Referring to FIG. 3B, in order to print a page the controller 202 causes the transport system 204 to move an unprinted page from the media supply 212 along the second path 320. When the page reaches a print area 306, the controller 202 causes the print engine 208 to print the page. The printed page is then discharged into the output tray 217.

Page Printing (PPS Function Enabled)

FIG. 3C illustrates generally how the MEP 106 may operate to print a page when the PPS function is enabled. Referring to FIG. 3C, the controller 202 causes the transport system 204 to move a page from the media supply 212, along the third page transport path 340, to the output tray 217. When the page reaches the print engine 208 (i.e., the print area 306), the controller 202 causes the print engine 208 to print the page.

When the page reaches the scanner 206 (i.e., the scan area 310), the controller 202 causes the scanner 206 to scan the just printed page.

Operation of Computer 104

It is again noted that the application software 124 enables a user of the computer 104 to print a document (e.g., the document 140) on the MFP 106. Prior to printing the document, a user can interact with the application software 124 to select various printing functions that are supported by the MFP 106.

For example, a user can request that certain pages of a document, or the entire document, be printed with the MFP PPS function enabled.

Figure 4A:
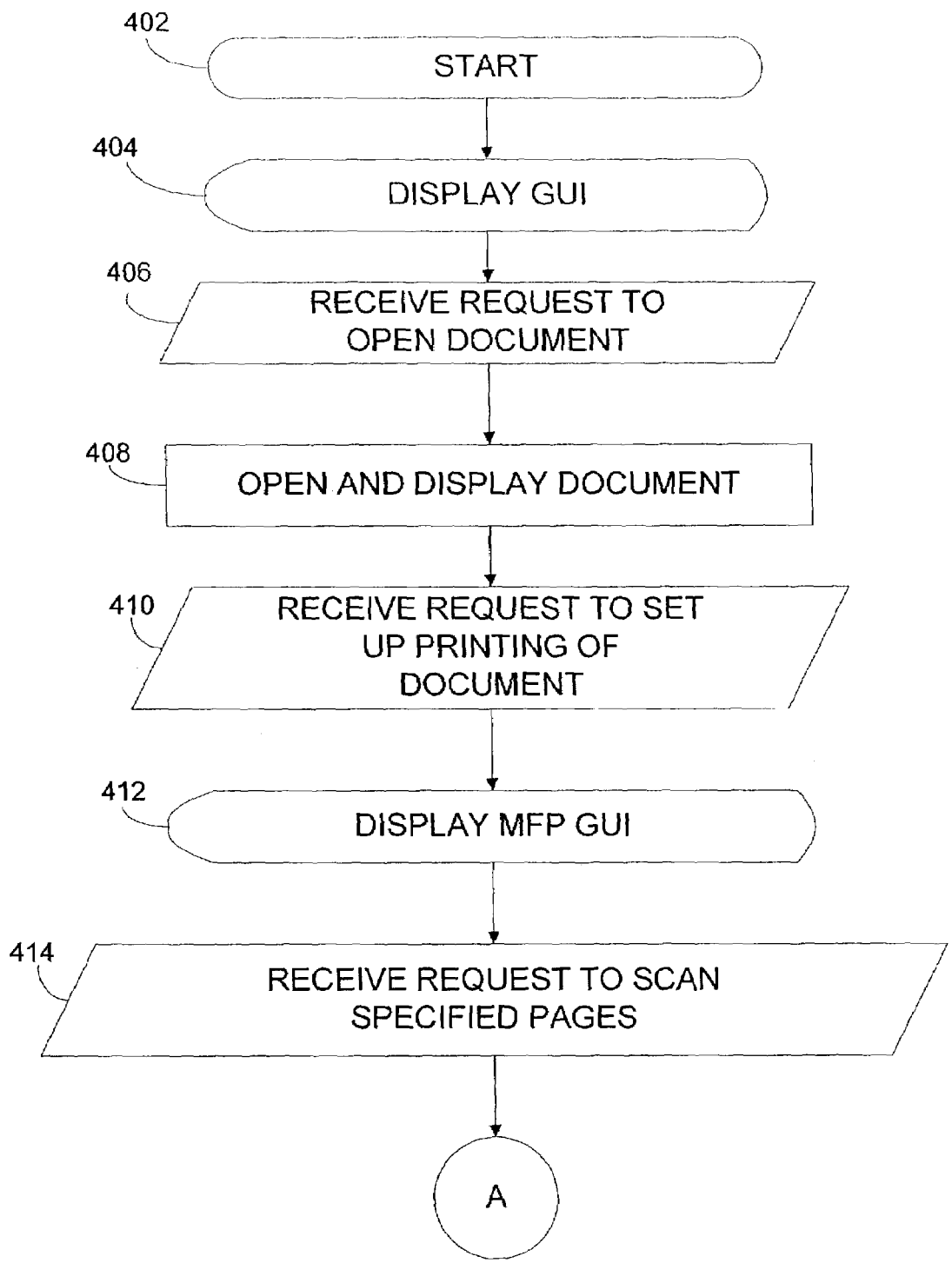
FIGS. 4A-B is a flow diagram illustrating how a computer connected to the MFP may function.
Figure 4B:
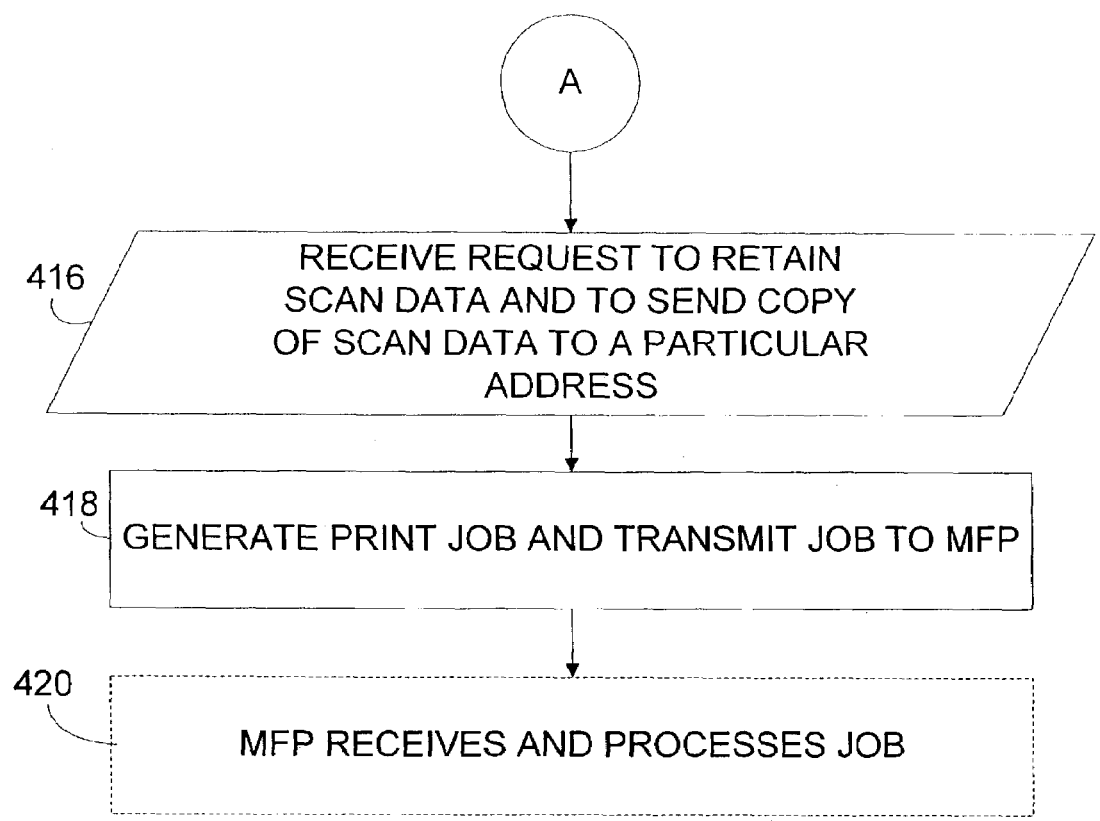

FIGS. 4A-B is a flow diagram for illustrating, by way of example, how the computer 104 may function to enable a user to print the document 140 using the PPS function of the MFP 106. As the steps in FIGS. 4A-B are explained, it will be assumed (for illustration purposes only) that the user 103 provides certain input to the computer 104.

Turning first to FIG. 4A, the user 103 interacts with the computer 104 to launch the application software 124 (step 402). Upon being launched, the application software 124 operates to display, on the computer 104, an initial graphical user interface (application GUI) (step 404).

The application GUI may provide various menus and options. A user can interact with the application GUI, for example, to input a request to open the document 140.

At step 406, the application software 124 receives a request from the user 103 to open the document 140. The application software 124 responds to this user input by opening and displaying the document 140 on the computer 104 (step 408).

At step 410, the user 103 inputs a request to set-up the printing of the document 140 on the MFP 106. In response to this input, the application software 124 operates to display a graphical user interface (MFP GUI) (step 412). According to one implementation, the MFP GUI may be in the form of one or more print dialog boxes.

In general, the MFP GUI allows a user to select various printing and post printing options that are offered by the MFP 106. With respect to the PPS function, the MFP GUI may allow a user to request that only certain pages of the document 140 are to be printed with the PPS function enabled. Alternatively, or in addition too, the MFP GUI may allow a user to request that the entire document 140 be printed with the PPS function enabled.

Additionally, the MFP GUI may also allow a user to specify how the MFP 106 is to process the scan data that will be generated by scanning the document pages. For example, the MFP GUI may allow a user to request that the MFP 106 is to transmit the scan data to one or more electronic addresses. The user may be given the option to specify these addresses. A user may specify, for example, his/her own e-mail address so that he/she receives a copy of the scan data in the form of an e-mail message. This email message may include the scan data as an attached document. The document could be in a variety of formats, such as, Portable Document Format (PDF), Joint Photographic Experts Group (JPEG), etc.

Alternatively, or in addition to, the MFP GUI may also allow a user to input a request that the MFP 106 retain a copy of the scan data in the non-volatile memory 209.

At step 414, the user 103 interacts with the MFP GUI to input a request to print certain pages of the document 140 with the PPS function enabled. For ease of the following discussion, the pages specified at step 414 may be referred to herein as the "target pages" of the document 140.

At step 416, the user 103 further interacts with the MFP GUI to request that the MFP 106 retain a copy of the scan data generated by scanning the target page. Also at step 416, the user 103 interacts with the MFP GUI to request that the MFP 106 transmit the scan data to a particular e-mail address. For ease of discussion, the e-mail address may be referred to herein as the "target address".

At step 418, the application software 124 operates to generate a print job. At step 418, the application software 124 operates to transmit the print job to the MFP 106.

The print job includes the appropriate commands to direct the MFP 106 to print the document 140 in accordance with the inputted user preferences provided by the user 103. As indicated above, the user 103 inputted these preferences by interacting with the MFP GUI. In this example, therefore, the print job includes commands that direct the MFP 106 to:
 a) print the document 140;
 b) enable the PPS function when printing the target pages of the document 140;
 c) transmit the scan data (generated by scanning the target pages) to the target address; and
 d) locally retain a copy of the scan data.

At step 420, the MFP 106 receives and processes the print job.

Figure 5:
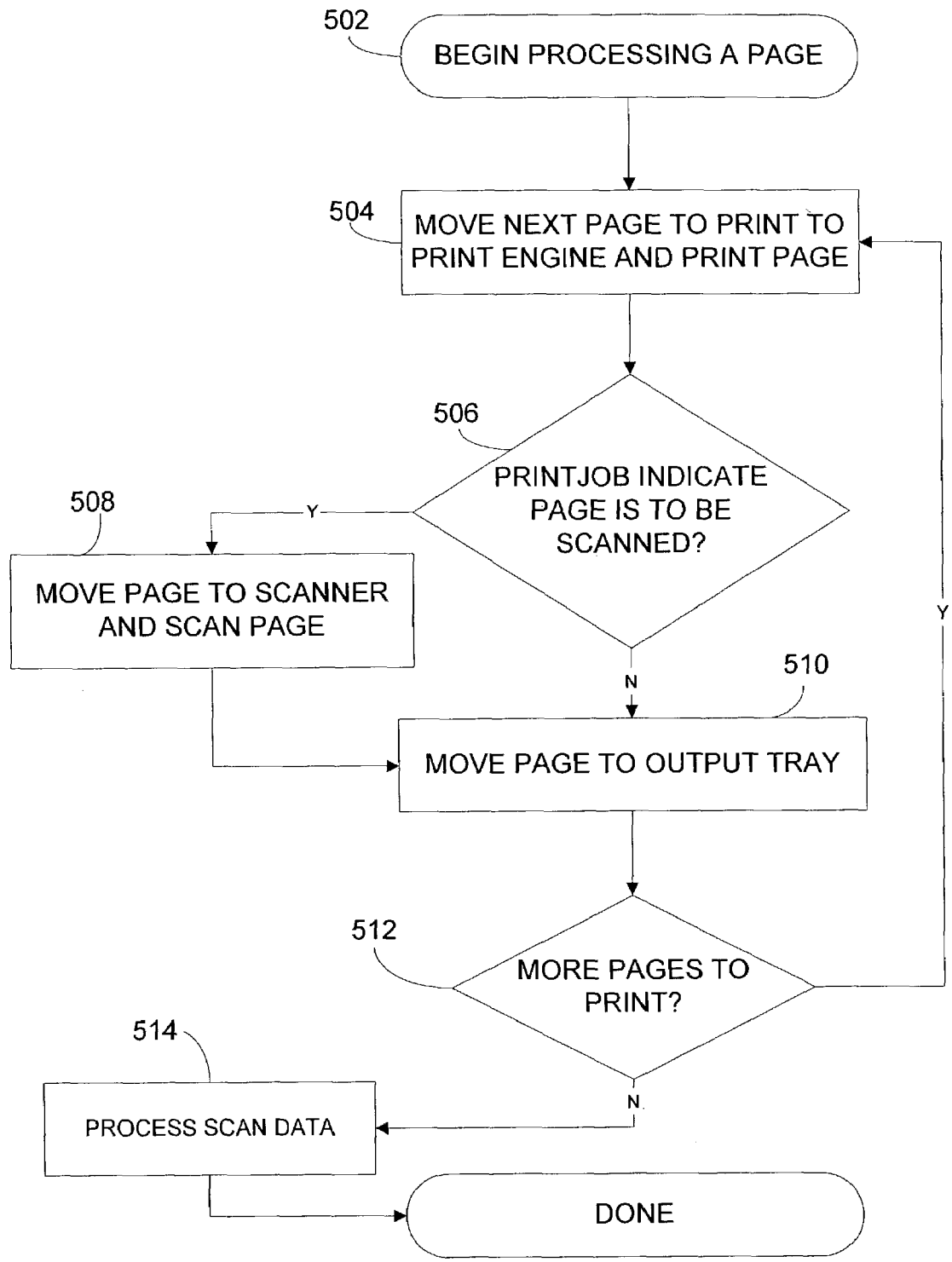
FIG. 5 is a flow diagram illustrating the operation of the MFP to process a print job.
Figure 6:
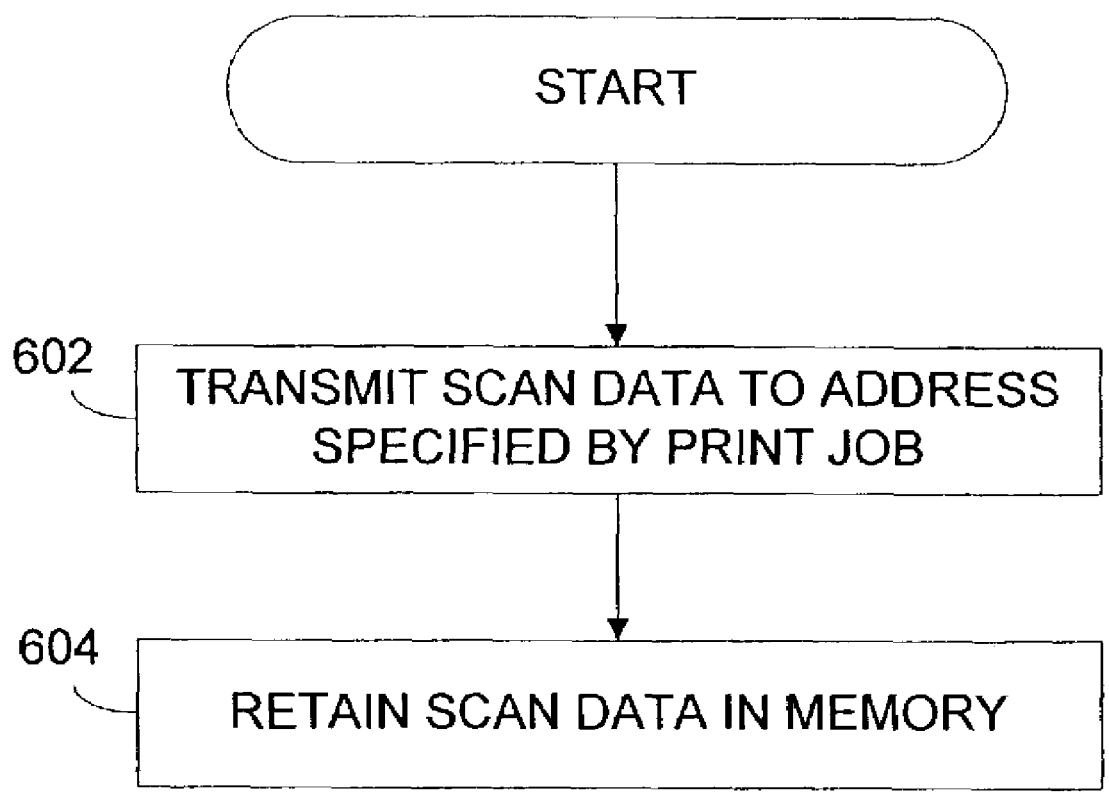
FIG. 6 illustrates one example of how a controller of the MFP may operate to process scan data.

FIG. 5 and FIG. 6 are flow diagrams illustrating the operation of the MFP 106, under the control of the controller 102, to process the print job at step 420.

Referring to FIG. 5, the controller 102 begins processing the first page of the print job by causing the media transport system 204 to move a media sheet from the media supply 212 to the print engine 208 (step 502). When the media sheet reaches the print engine 208, the controller 102 causes the print engine 208 to print the page (step 504).

If the print job indicates the page is to be printed with the PPS function enabled (decision step 506), the controller 102 causes the media transport system 208 to move the printed page from the print engine 208 to the scanner 206. When the page reaches the scanner 206, the controller 102 causes the scanner 206 to scan the page (step 508). The page is then moved to the output tray 217. [Note that all of the target pages of the document 140 are printed and then scanned in this manner].

If, however, the print job does not indicate that the present page (printed at step 504) is to printed with the PPS function enabled (decision step 506), the controller 102 causes the media transport system 208 to move the printed page from the print engine to the output tray 217 (step 510).

At decision step 512, the controller 102 determines if additional pages are to be printed. If so, then the controller 102 repeats the steps described above in order to process the next page. After each page has been printed, the procedure ends.

At step 514, the controller 102 processes the data (scan data) generated by scanning the target pages.

FIG. 6 illustrates one example of how the controller 102 may operate to process the scan data at step 514. As noted above, the print job includes commands that direct the MFP 106 to: (a) transmit the scan data to the target address and (b) locally retain the scan data.

In response to these commands, the controller 102 operates to transmit the scan data to the target address over the communication link 108 (step 602). It is noted that the controller 202 may transfer the scan data in a format that is different that the format the data was originally created.

Additionally, the controller 102 operates to retain a copy of the scan data in the non-volatile memory 209 (step 604).

In some implementations, the MFP 106 is configured to allow remote users to view the retained scan data. For example, the MFP 106 may include an embedded WEB server. The WEB server may operate, upon receiving a request from a computer client, to send the scan data to the client. The client receives and displays the image described by the scan data. The client may display the image in the form of one or more WEB pages. It is also noted that the MFP 106 may also be configured to allow walk-up users to print copies of the retained scan data.

Figure 7:
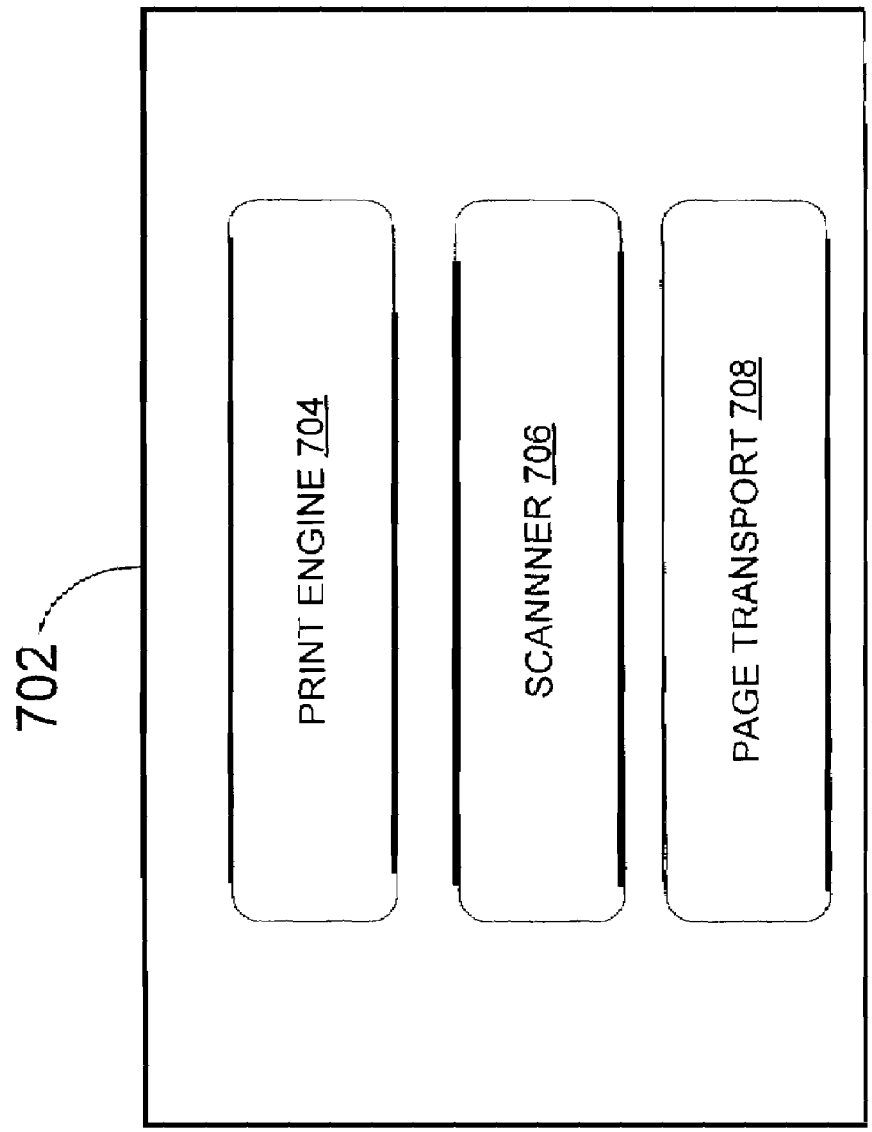
FIG. 7 is a high-level block diagram of a device that includes a print engine, a scanner device and a page transport system.
Figure 8:
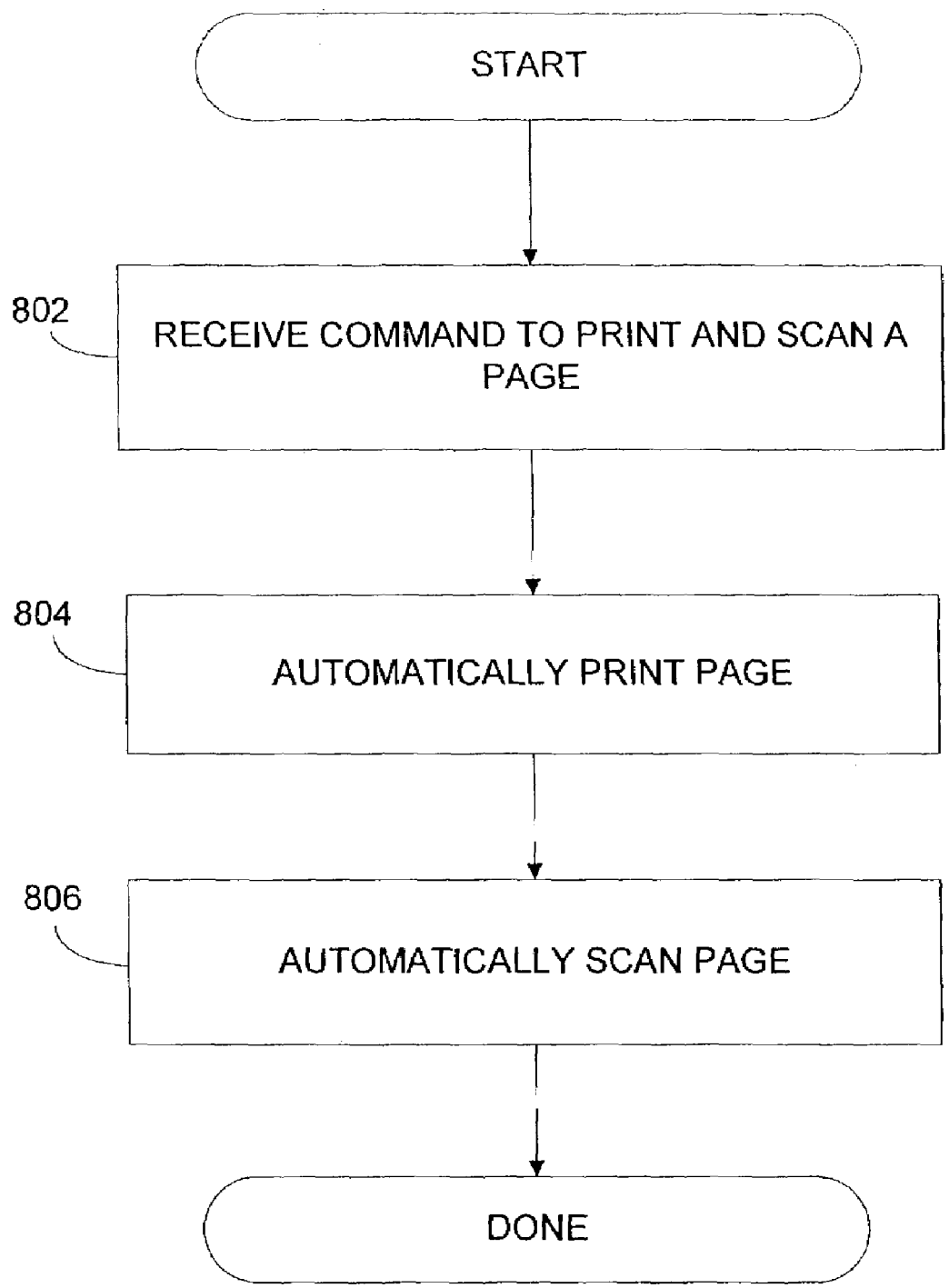
FIG. 8 is a flow diagram illustrating how the device may function.

FIG. 7 and FIG. 8 illustrate another embodiment of the invention. FIG. 7 shows a device 702 that includes a print engine 704, a scanner device 706 and a media transport system 708. The print engine 704 and the scanner device 706 may be arranged in any appropriate manner within the device 702. The scanner device 706 may be configured to be used by walk-up user to scan a page. In some implementations, for example, the scanner device 706 may represent a flat bed type scanner.

The transport system 708 can transport a media sheet to the print engine 704 and then to the scanner 706 for scanning. The media transport system 708 may include rollers and/or belts or any other mechanism for transporting media through the device 702.

FIG. 8 is a flow diagram for illustrating how the device 702 may function. Referring to FIG. 8, the device 702 receives a command to print and then scan a page (step 802). The command may be received locally or remotely. In response to the command, the device 702 operates to automatically print the page (step 804) and then scan the page (step 806).

It is also noted that the present invention may be embodied in the form of a "computer-readable medium". As used herein, the phrase "computer-readable medium" can refer to any medium that can contain, store or propagate computer executable instructions. Thus, in this document, the phrase "computer-readable medium" may refer to a medium such as an optical storage device (e.g., a CD ROM) or a magnetic storage device (e.g., a magnetic tape). The phrase "computer-readable medium" may also refer to signals that are used to propagate the computer executable instructions over a network, such as (for example) the Public Internet.

Figure 9:
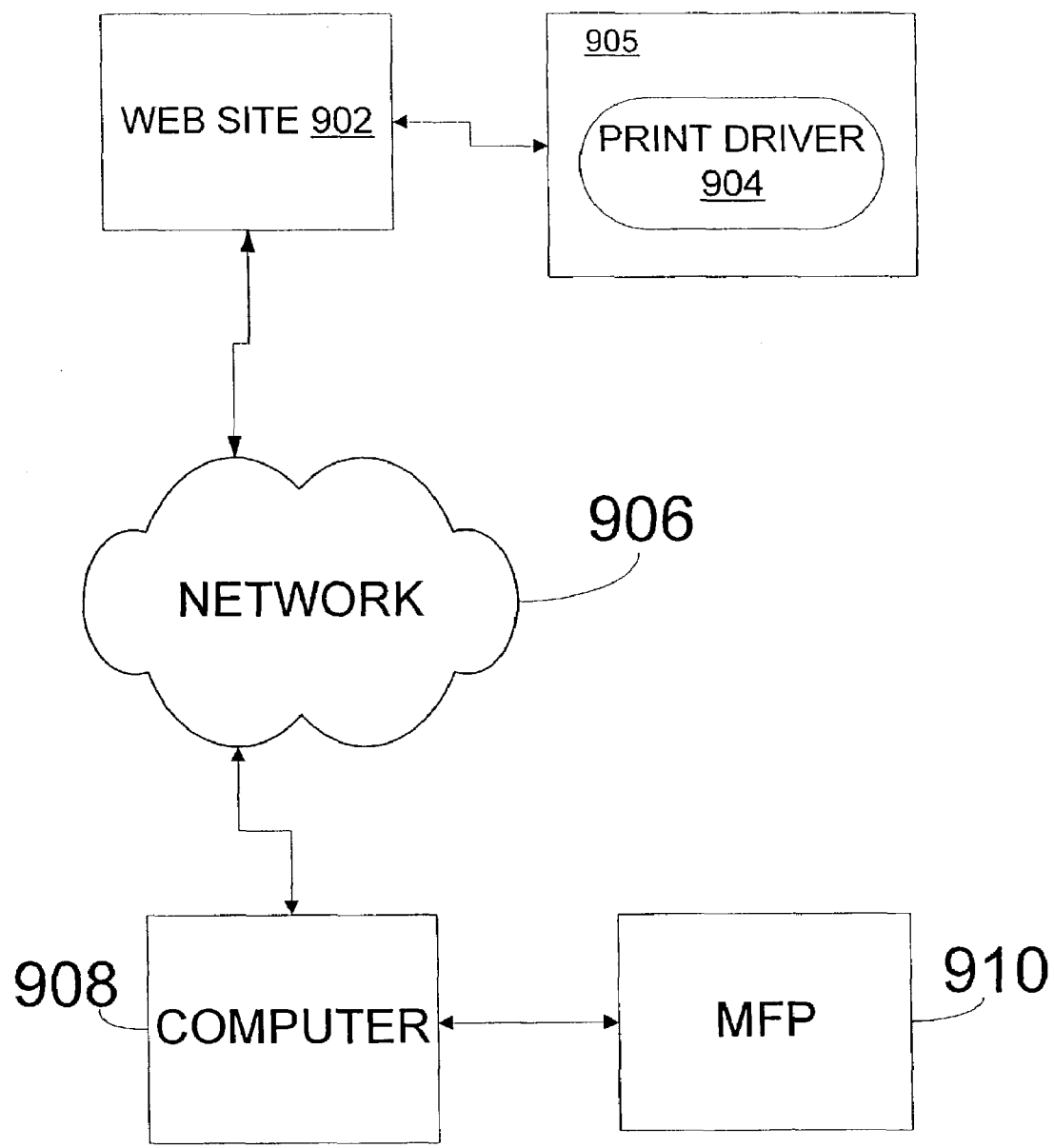
FIG. 9 illustrates a WEB site that can transmit a copy of a print driver over a network to a computer client.

FIG. 9 illustrates yet another embodiment of the invention. FIG. 9 shows a WEB site 902 that can transmit a copy of a print driver 904 over a network 906 to computer clients. The print driver 904 is stored in a memory 905. The memory 905 is accessible by the WEB site 902. The print driver 904 enables computers (e.g., the computer 908) to print on certain MFP's that include a PPS function (e.g., MFP 910). The network 906 may represent, for example, the Public Internet.

It is noted that the memory 905 is a computer-readable medium and represents and embodiment of the invention. Additionally, the signals used to propagate the print driver 904 over the network 906 are also considered a type of computer-readable medium. These signals, therefore, represent yet another embodiment of the invention.

The print driver 904 includes a program of commands that are executable by the computer 908 to display a user interface. The user interface enables a user of the computer 908 to set up printing of a document on, for example, the MFP 910. In particular, the user interface enables a user to request that the MFP 910 print one or more pages of a document with the PPS function enabled.

FIG. 10 illustrates an example of a user interface 1002 that may be displayed by the computer 908 under the direction of the print driver 904. This particular example user interface 1002 enables a user to:

a) request that the MFP print the entire document with the PPS function enabled (selectable option 1008);

b) request that the MFP print selected pages of the document with the PPS function enabled (selectable option 1010);

c) specify a destination to receive the scan data generated by scanning the selected pages (selectable option 1012); and d) request that a copy of the scan data be locally retained (selectable option 1014).

It is noted that the print driver 904 may provide a number of other user interfaces that enable the user to specify other printing preferences. Selecting the "done" button 1016 may cause a different one of these user interfaces to be displayed.

The print driver 904 includes a program of commands that are executable by the computer 908 to generate and transmit a print job to the MFP 910. The print job includes the appropriate commands for directing the MFP 910 to print the present document on the MFP 910 in accordance with the user input received via the user interface 1002.

Thus, for example, assume a user of the computer 908 interacts with the user interface 1002 to provide the input as indicated in FIG. 10. That is, a user selects the following options:

a) option 1010;
b) option 1012; and
c) option 1014

The user further specifies that page 3 and page 5 are to be printed with the PPS function enabled by entering these numbers in input field 1004. The user also inputs an e-mail address: "REESE.COM" into input field 1006.

In response to all this user input, the computer 908 (under the direction of the print driver 904) operates to generate a print job that directs the MFP 910 to print page 3 and page 5 of the present document with the PPS function enabled. The print job further directs the MFP 910 to locally retain the scan data generated by scanning page 3 and page 5 and to also e-mail a copy of this scan data to "REESE.COM". REESE.COM may be the e-mail address of a user, a system administrator, etc.

Although several specific embodiments of the invention have been described and illustrated, the invention is not to be limited to specific forms or arrangements of parts so described and illustrated. The invention is limited only by the claims and the equivalents thereof.

What is claimed is:

1. In a multifunctional peripheral (MFP) that includes a print engine for printing pages and a scanner for use by walk-up users to scan a page, a method comprising:
   receiving a print job that describes at least one page;
   printing the at least one page at the print engine;
   determining, for each page in the print job, if the print job indicates the printed page is to be scanned;
   for each page for which it is determined that the print job indicates the printed page is to be scanned, then performing the following substeps:
      moving the printed page from the print engine to the scanner; and
      scanning the printed page at the scanner to generate scan data; and
   storing the scan data in a non-volatile memory.

2. The method of claim 1, wherein the substeps further include moving the printed page from the scanner to a location accessible by a user.

3. The method of claim 1, further comprising:
   for each page for which it is determined that the print job does not indicate the page is to be scanned, then moving the printed page from the print engine to a location accessible by a user.

4. The method of claim 1, further comprising:
   for each page for which it is determined that the print job does not indicate the page is to be scanned, then moving the printed page from the print engine to an exit tray so as to bypass the scanner.

5. The method of claim 1, further comprising:
   after the scan data is stored, receiving a request to print the scan data; and
   responding to the request by printing the scan data.

6. The method of claim 5, wherein the request is received over a communication network.

7. The method of claim 5, wherein the request is received at a local control panel of the MFP.

8. The method of claim 1, wherein the print job includes an address of an external device, the method further including transmitting the scan data to the address.

9. The method of claim 8, wherein the transmitting step includes e-mailing the scan data to the address.

10. The method of claim 1, wherein the method further includes:
    receiving a request from a client computer to access the stored scan data;
    in response to the request, causing the client computer to display the scan data.

11. The method of claim 10, wherein the causing step is performing by causing the client computer to display the image described by the scan data in the form of at least one WEB page.

12. In a multifunctional peripheral (MFP) that includes a print engine for printing pages and a scanner for use by walk-up users to scan a page, a method comprising:
    receiving a print job that describes at least one page;
    printing the at least one page at the print engine;
    determining, for each page in the print job, if the print job indicates the printed page is to be scanned; and
    for each page for which it is determined that the print job indicates the printed page is to be scanned, then performing the following substeps:
       moving the printed page from the print engine to the scanner; and
       scanning the printed page at the scanner.

13. The method of claim 12, wherein the substeps further include moving the printed page from the scanner to a location accessible by a user.

14. The method of claim 12, further comprising:
    for each page for which it is determined that the print job does not indicate the page is to be scanned, then moving the printed page from the print engine to a location accessible by a user.

15. The method of claim 12, further comprising:
for each page for which it is determined that the print job does not indicate the page is to be scanned, then moving the printed page from the print engine to an exit tray so as to bypass the scanner.

16. The method of claim 12, wherein the print job includes an address of an external device, the scanning substep results in scan data being generated, and the substeps further include:
transmitting the scan data to the address.

17. The method of claim 16, wherein the transmitting step includes e-mailing the scan data to the address.

18. A device, comprising:
a scanner;
a print engine for printing a page; and
a controller operatively coupled to the scanner and the print engine, the controller configured to determine, for each page in a print job, if the print job indicates the page is to be scanned and, for each page for which it is determined that the print job indicates the page is to be scanned, scan the printed page.

19. A system, comprising:
a multifunctional peripheral (MFP);
a computer connected to the MFP via a communication link; and
wherein the MFP includes a scanner for use by a walk-up user of the MFP to scan a page; and
wherein the computer provides a user interface that enables a user of the computer to request that a document be printed and then scanned on the MFP;
wherein the computer is responsive to the request by transmitting a print job to the MFP;
wherein, for each page, the print job directs the MFP to print and scan the document;
wherein the MFP is responsive to the print job by printing the document and scanning the printed document;
wherein the MFP utilizes the scanner to scan the document.

20. The system of claim 19, wherein the communication link includes the PUBLIC INTERNET.

21. A tangible computer-readable medium having embodied therein a program of commands executable by a client computer to:
display a user interface that enables a user of the client computer to set-up printing of a document on an MFP that provides both printing and scanning functions; and
wherein the user interface enables the user to input a request that a particular document be printed by the MFP and a request that only selected individual pages of the document be scanned by the MFP after being printed.

22. The computer readable medium of claim 21, wherein the program of commands includes commands executable by the client computer to:
generate a print job that directs the MFP to (i) print the document and (ii) scan each user selected page of the document after being printed.

23. The computer readable medium of claim 22, wherein the program of commands includes commands executable by the client computer to:
transmit the print job to the MFP.

24. The computer readable medium of claim 21, wherein the user interface further enables the user to specify a destination that is to receive scan data generated by the MFP scanning the at least one page.

25. The computer readable medium of claim of claim 24, wherein the program of commands includes commands executable by the client computer to:
generate a print job that directs the MFP to (i) print the document, (ii) scan the at least one page so as to generate scan data; and (iii) transmit the scan data to the user specified destination.

26. A computer connectable to an MFP having a post print scan (PPS) function, comprising:
a processing unit capable of transmitting a print job to the MFP over a network; and
wherein the print job describes a page to be printed; and
wherein, for each page the print job includes at least one command directing the MFP to print the page with the PPS function enabled.

27. The computer of claim 26, further comprising:
a user interface that enables a user to input a request to print the page with the PPS function enabled; and
wherein the processing unit is responsive to the input by including the at least one command in the print job.

28. The computer of claim 27, wherein the user interface includes a graphical user interface (GUI).

* * * * *

UNITED STATES PATENT AND TRADEMARK OFFICE
CERTIFICATE OF CORRECTION

| | |
|---|---|
| PATENT NO. | : 7,382,505 B2 |
| APPLICATION NO. | : 10/273286 |
| DATED | : June 3, 2008 |
| INVENTOR(S) | : Daniel Travis Lay et al. |

It is certified that error appears in the above-identified patent and that said Letters Patent is hereby corrected as shown below:

In column 4, line 5, delete "MEP" and insert -- MFP --, therefor.

In column 10, line 21, in Claim 25, delete "of claim" before "24".

In column 10, line 34, in Claim 26, after "each page" insert -- , --.

Signed and Sealed this

Eighteenth Day of August, 2009

David J. Kappos
*Director of the United States Patent and Trademark Office*